United States Patent
Tsirkin et al.

(10) Patent No.: US 9,201,676 B2
(45) Date of Patent: *Dec. 1, 2015

(54) REDUCING OR SUSPENDING TRANSFER RATE OF VIRTUAL MACHINE MIGRATION WHEN DIRTYING RATE EXCEEDS A CONVERGENCE THRESHOLD

(71) Applicant: Red Hat Israel, Ltd., Raanana (IL)

(72) Inventors: Michael Tsirkin, Yokneam Yillit (IL); Ronen Hod, Shoham (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,761

(22) Filed: Jun. 17, 2015

(65) Prior Publication Data
US 2015/0277962 A1    Oct. 1, 2015

Related U.S. Application Data

(63) Continuation of application No. 13/903,555, filed on May 28, 2013, now Pat. No. 9,081,599.

(51) Int. Cl.
*G06F 9/455* (2006.01)
*G06F 9/48* (2006.01)

(52) U.S. Cl.
CPC ............ *G06F 9/45533* (2013.01); *G06F 9/455* (2013.01); *G06F 9/48* (2013.01); *G06F 9/4856* (2013.01); *G06F 2009/4557* (2013.01)

(58) Field of Classification Search
None
See application file for complete search history.

(56) References Cited

U.S. PATENT DOCUMENTS

| | | |
|---|---|---|
| 7,716,667 B2 | 5/2010 | van Rietschote et al. |
| 8,185,893 B2 | 5/2012 | Hyser et al. |
| 8,370,837 B2 | 2/2013 | Emelianov et al. |
| 2011/0010711 A1 | 1/2011 | Patwardhan |
| 2011/0099318 A1 | 4/2011 | Hudzia et al. |
| 2011/0145471 A1 | 6/2011 | Corry et al. |
| 2011/0197039 A1 | 8/2011 | Green et al. |
| 2011/0225285 A1 | 9/2011 | Patel et al. |
| 2011/0238820 A1 | 9/2011 | Matsuoka |
| 2012/0036251 A1 | 2/2012 | Beaty et al. |

(Continued)

FOREIGN PATENT DOCUMENTS

WO     2012/100544    8/2012

OTHER PUBLICATIONS

Liu, H., et al., "Live Migration of Virtual Machine Based on Full System Trace and Replay", Proceedings of the 18th ACM International Symposium on High Performance Distributed Computing, 2009.

*Primary Examiner* — Emerson Puente
*Assistant Examiner* — Benjamin Wu
(74) *Attorney, Agent, or Firm* — Lowenstein Sandler LLP

(57) ABSTRACT

An example method for adjusting the rate of transfer of the execution state of a virtual machine undergoing live migration may comprise determining, by a processor, a first rate being a rate of change of an execution state of a virtual machine undergoing live migration from a first computer system to a second computer system. The example method may further comprise determining a second rate being a rate of transfer of the execution state of the virtual machine to the second computer system. The example method may further comprise, responsive to determining that a ratio of the first rate to the second rate exceeds a first threshold ratio, suspending the transfer of the virtual machine execution state to the second computer system.

20 Claims, 3 Drawing Sheets

(56) References Cited

U.S. PATENT DOCUMENTS

| | | |
|---|---|---|
| 2012/0084782 A1 | 4/2012 | Chou et al. |
| 2012/0221710 A1 | 8/2012 | Tsirkin |
| 2012/0233331 A1 | 9/2012 | Voccio et al. |
| 2012/0278571 A1 | 11/2012 | Fleming et al. |
| 2013/0185719 A1* | 7/2013 | Kar et al. ............... 718/1 |
| 2013/0326173 A1 | 12/2013 | Tsirkin |
| 2013/0326174 A1 | 12/2013 | Tsirkin |
| 2013/0326175 A1 | 12/2013 | Tsirkin |
| 2013/0346613 A1 | 12/2013 | Tarasuk-Levin et al. |
| 2014/0108854 A1 | 4/2014 | Anthony et al. |
| 2014/0282522 A1 | 9/2014 | Daley et al. |
| 2014/0298338 A1 | 10/2014 | Doi |

* cited by examiner

REDUCING OR SUSPENDING TRANSFER RATE OF VIRTUAL MACHINE MIGRATION WHEN DIRTYING RATE EXCEEDS A CONVERGENCE THRESHOLD

RELATED APPLICATIONS

This application is a continuation of U.S. patent application Ser. No. 13/903,555 filed on May 28, 2013, the entire content of which is incorporated by reference herein.

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
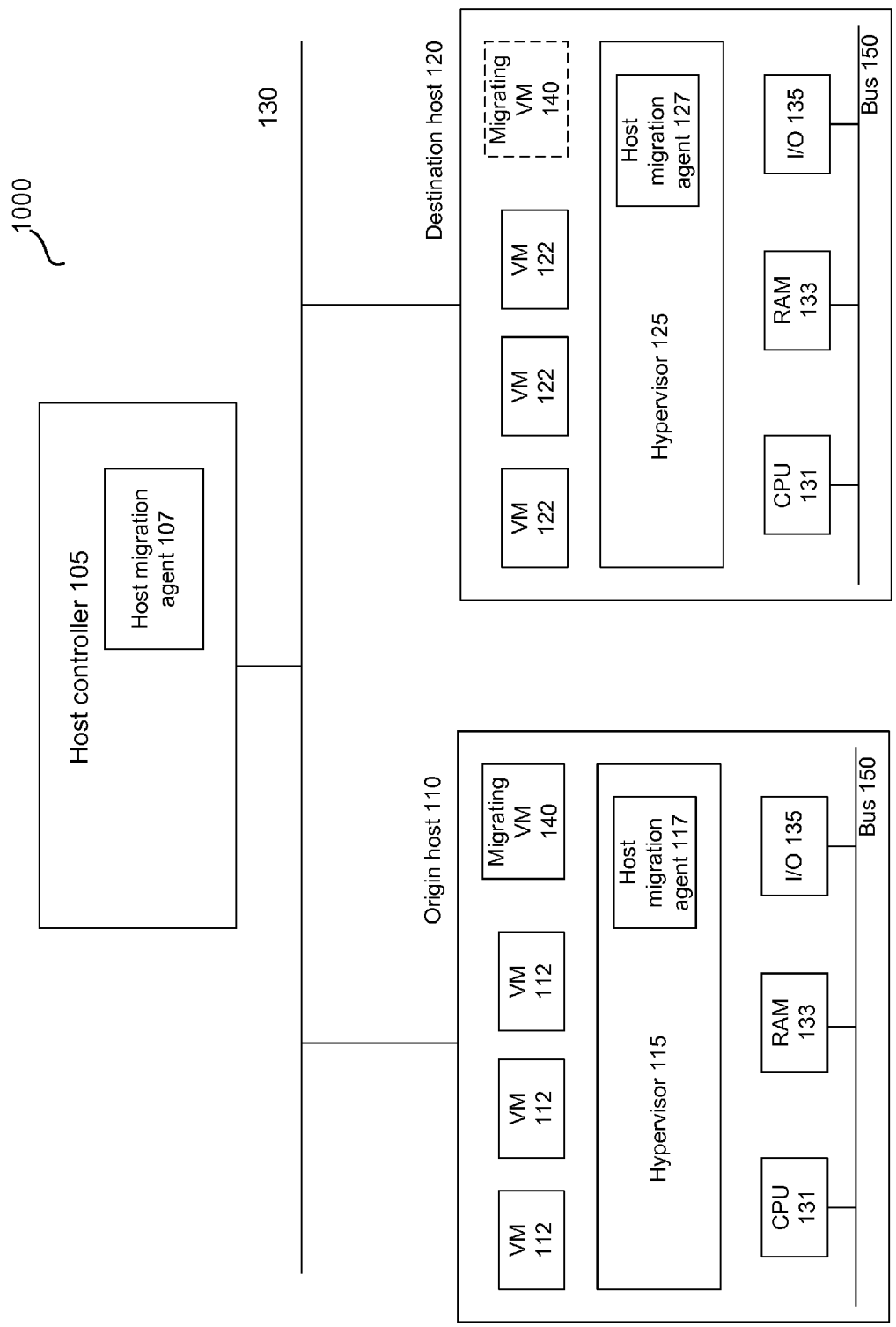
FIG. 1 depicts a high-level component diagram of one illustrative embodiment of a computer system 1000 in accordance with one or more aspects of the present disclosure.

Described herein are methods and systems for adjusting the rate of transmission of the execution state of a virtual machine undergoing live migration. "Live migration" herein refers to the process of moving a running virtual machine from an origin host computer system to a destination host computer system without disrupting the guest operating system and/or the applications executed by the virtual machine. Live migration may involve copying the virtual machine execution state from the origin host to the destination host. The virtual machine execution state may comprise the memory state, the virtual processor state, the virtual devices state, and/or the network connectivity state.

In certain implementations, a migration agent may copy the state of the virtual machine being migrated, including a plurality of memory pages, from the origin host to the destination host while the virtual machine is still running at the origin host. Upon completing the memory copying operation, the migration agent may re-copy the memory pages which have been modified, or became "dirty," during the memory copying operation. The migration agent may iteratively repeat the copying of dirty memory pages, until a pre-defined convergence condition has been met, e.g., until the memory pages "dirtying" rate becomes less than or equal to the virtual machine state transfer rate. When the convergence condition is met, the virtual machine may be stopped at the origin host, the dirty memory pages may be copied to the destination host, and the virtual machine may be restarted at the destination host.

If the virtual machine being migrated is extensively modifying the memory, the migration process may never converge, e.g., if the rate of the "dirtying" the memory pages steadily exceeds the effective network throughput between the origin and the destination host. Furthermore, the migration process itself may consume a significant portion of CPU and network resources of both the origin and the destination hosts, thus degrading their performance and eventually causing the migration process to fail.

To prevent host computer system performance degradation and/or the migration process failure, the migration agent may, in certain implementations, responsive to determining that the virtual machine state change rate exceeds the virtual machine state transfer rate, cause the virtual machine to reduce the rate of the state change, e.g., by introducing delays into virtual CPUs and/or memory operations. However, this approach may be detrimental to successful execution of one or more processes executed by the virtual machine. Aspects of the present disclosure address the above deficiencies by reducing the virtual machine state transfer rate or even suspending the virtual machine state transmission to the destination host responsive to detecting a potential non-convergence condition (e.g., the virtual machine state change rate exceeding the virtual machine state transfer rate). The migration agent may then increase the virtual machine state transmission rate or resume the virtual machine state transmission, once the virtual machine state stabilizes allowing the migration process to complete.

Various aspects of the above referenced methods and systems are described in details herein below by way of examples, rather than by way of limitation.

FIG. 1 depicts a high-level component diagram of one illustrative example of a computer system 1000 in accordance with one or more aspects of the present disclosure. The computer system 1000 may include computer systems 110 and 120 interconnected via a network 130. Each of the host computer systems 110 and 120 may include one or more processors 131 communicatively coupled to memory devices 133 and input/output (I/O) devices 135. Local connections within each of the hosts 110 and 120, including the connections between processors 131, memory 133, and I/O devices 135 may be provided by one or more local buses 150 of suitable architecture.

"Physical processor" or "processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Each of the host computer systems 110 and 120 may run a plurality of virtual machines 112 and 122, by executing the hypervisors 115 and 125, respectively. Each of the hypervisors 115 and 125 may abstract the physical layer, including processors, memory, and I/O devices, and present this abstraction to virtual machines 112, 122 as virtual devices, including virtual processors, virtual memory, and virtual I/O devices.

A virtual machine 112, 122 may execute a guest operating system which may utilize the underlying virtual devices, including virtual processors, virtual memory, and virtual I/O devices. One or more applications may be running on a virtual machine 112 under the guest operating system.

As schematically illustrated by FIG. 1, each of the hosts 110 and 120 may be communicatively coupled to a host controller 105 which may reside on a designated computer system or on one of the hosts 110, 120. The host controller 105 may manage a plurality of virtual machines, including the virtual machines 112 and 122. The host controller 105 may create a virtual machine, delete a virtual machine, and perform other virtual machine management functions. In certain implementations, the host controller 105 may include a migration agent 107 which may manage live migration of virtual machines between host computer systems 110 and 120 in accordance with one or more aspects of the present disclosure. In certain implementations, the host computer systems 110 and 120 may include a host migration agent 117 and 127, respectively, designed to perform at least some of the virtual machine migration management functions in accordance with one or more aspects of the present disclosure.

For illustrative purposes, the host computer system 110 may be referred to as the origin host from which a VM 140 may migrate to the host computer system 120, which may accordingly be referred to as the destination host. Live migration may involve copying the virtual machine execution state from the origin host to the destination host. The virtual machine execution state may comprise the memory state, the virtual processor state, the virtual devices state, and/or the connectivity state.

In certain implementations, the migration agent 107, 117, and/or 127 may copy, over the network 130, the execution state of the migrating virtual machine 140, including a plurality of memory pages, from the origin host 110 to the destination host 120 while the virtual machine 140 is still running on the origin host 110. Upon completing the virtual machine state copying operation, the migration agent may re-copy the memory pages which have been modified, or became "dirty," during the state copying operation. The migration agent may iteratively repeat the copying of dirty memory pages, until a pre-defined condition has been met, indicating the convergence of the migration process.

In one example, the migration process convergence condition may be represented by the memory pages "dirtying" rate becoming less than a pre-defined threshold rate. In another example, the migration process convergence condition may be represented by the memory pages "dirtying" rate being less than or equal to the virtual machine state transfer rate. In a further example, the migration process convergence condition may be represented by the memory pages "dirtying" rate being less than or equal to the network throughput. In a further example, the migration process convergence condition may be represented by the ratio of the memory pages "dirtying" rate to the virtual machine state transfer rate becoming less than or equal to a pre-defined threshold ratio.

In one example, the memory pages "dirtying" rate may be defined as the size of the memory pages which became "dirty" since the start of the last copying operation. In another example, the memory pages "dirtying" rate may be defined as the size of the memory pages which are becoming "dirty" in a unit of time. The virtual machine state transfer rate may accordingly be defined as the amount of data that may be transmitted from the origin host to the destination host over the network since the start of the last copying operation, or as the amount of data that may be transmitted from the origin host to the destination host over the network in a unit of time. In one example, the virtual machine state transfer rate may be represented by the theoretical maximum amount of data which may be transmitted from the origin host to the destination host over the network (e.g., based on the data link layer throughput). Alternatively, the virtual machine state transfer rate may be represented by the observed amount of data which have actually been transmitted from the origin host to the destination host over the network (e.g., based on the average size of data transmitted over a pre-defined period of time).

When the convergence condition is met, the virtual machine 140 may be stopped on the origin host 110, the state of the virtual machine including the remaining dirty memory pages may be copied to the destination host 120, and the virtual machine 140 may be restarted on the destination host 120. However, if the virtual machine being migrated is extensively modifying the memory, the migration process may never converge, e.g., if the rate of the "dirtying" the memory pages exceeds the effective network throughput between the origin and the destination host. Furthermore, the migration process itself may consume a significant portion of CPU and network resources of both the origin and the destination hosts, thus degrading their performance and eventually causing the migration process to fail.

In certain implementations, in order to prevent the host computer system performance degradation and/or the migration process failure, the migration agent may, upon detecting a migration process non-convergence condition examples of which are provided herein above, suspend the virtual machine state transmission to the destination host until the virtual machine state stabilizes. In certain implementations, the migration agent may reduce the rate of the virtual machine execution state transfer to the destination host, rather than suspending the execution state transfer. The migration agent may continue monitoring the rate of the virtual machine state change, and may resume the transmission or increase the state transfer rate once the virtual machine state stabilizes, thus allowing the migration process completion.

In certain implementations, the migration agent may declare the migration process failure should the virtual machine state fail to stabilize upon expiration of a pre-defined timeout. Alternatively, the migration agent may switch to a post-copy migration method, by stopping the virtual machine, transferring a subset of the virtual machine execution state (including the virtual processor state and non-pageable memory state) to the destination host, resuming the virtual machine at the destination host, generating a page fault responsive to detecting the virtual machine's attempt to access a memory page which has not yet been transferred, and transferring the page from the origin host to the destination host responsive to the page fault.

Figure 2:
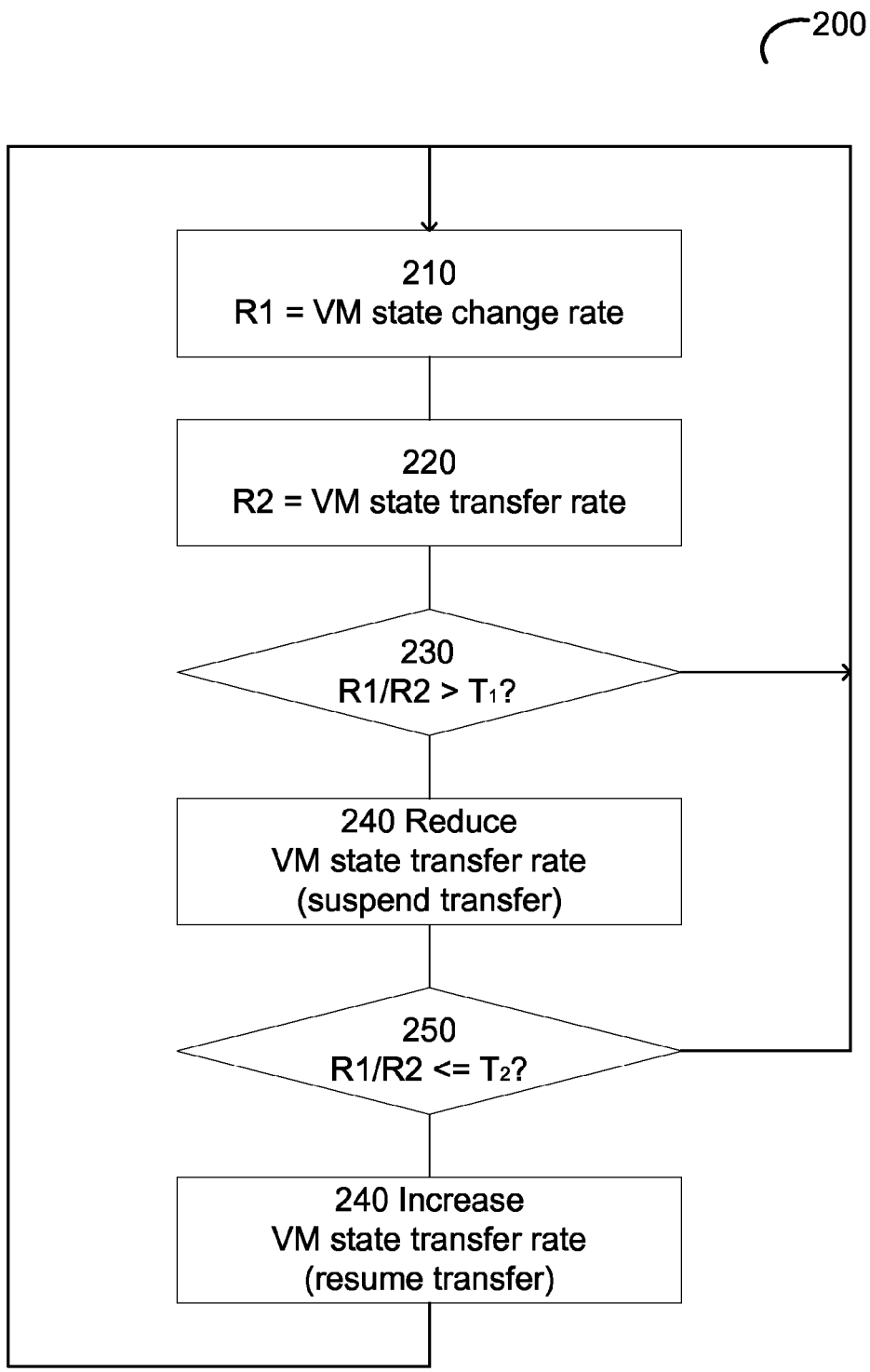
FIG. 2 depicts a flow diagram of a method for adjusting the rate of transmission of the execution state of a virtual machine undergoing live migration, in accordance with one or more aspects of the present disclosure.

FIG. 2 depicts a flow diagram of one embodiment of a method 200 for adjusting the rate of transmission of the execution state of a virtual machine undergoing live migration. The method 200 may be performed by a computer system that may comprise hardware (e.g., circuitry, dedicated logic, and/or programmable logic), software (e.g., instructions executable on a computer system to perform hardware simulation), or a combination thereof. The method 200 and/or each of its individual functions, routines, subroutines, or operations may be performed by one or more physical processors of the computer system executing the method.

At block 210, a migration agent executed by a computer system may determine the rate of change of an execution state of a virtual machine undergoing live migration from an origin host computer system to a destination host computer system. The virtual machine execution state may comprise the memory state, the virtual processor state, the virtual devices state, and/or the network connectivity state.

In certain implementations, the rate of change of an execution state of a virtual machine may be represented by the memory pages "dirtying" rate. The latter may, in one example, be defined as the size of the memory pages which became "dirty" since the start of the last copying operation. In another example, the memory pages "dirtying" rate may be defined as the size of the memory pages which are becoming "dirty" in a unit of time.

At block 220, the migration agent may determine the rate of transferring the execution state of the virtual machine from the origin host computer system to the destination host computer system over a network. In one example, the state transfer rate may be defined as the amount of data that may be transmitted from the origin host to the destination host over the network since the start of the last copying operation. In another example, the state transfer rate may be defined as the amount of data that may be transmitted from the origin host to the destination host over the network in a unit of time. In another aspect, the state transfer rate may be represented by the theoretical maximum amount of data which may be transmitted from the origin host to the destination host over the network (e.g., based on the data link layer throughput). Alternatively, the state transfer rate may be represented by the observed amount of data which have actually been transmitted from the origin host to the destination host over the network (e.g., based on the average size of data transmitted over a pre-defined period of time).

At block 230, the migration agent may ascertain whether the ratio of the state change rate to the state transfer rate exceeds a threshold convergence ratio. If the ratio of the state change rate to the state transfer rate exceeds the value of 1, the state change rate exceeds the state transfer rate, and the live migration process becomes non-converging. Thus, in one example, the threshold ratio may be provided by a positive value less than or equal to 1. If the above referenced condition evaluates as true, the processing may continue at step 240; otherwise, the method may loop back to step 210.

At block 240, the migration agent may reduce the rate of transferring the execution state of the virtual machine from the origin host computer system to the destination host computer system. In one example, the migration agent may suspend the transfer of the virtual machine execution state from the origin host computer system to the destination host computer system.

At block 250, the migration agent may ascertain whether the ratio of the state change rate to the state transfer rate is less than or equal to a second threshold ratio. If the ratio of the state change rate to the state transfer is less than or equal to 1, the state change rate does not exceed the state transfer rate, and the live migration process becomes converging. Thus, in one example, the second threshold ratio may be provided as 1. In another example, the second threshold ratio may be equal to the threshold convergence ratio. If the above referenced condition evaluates as true, the processing may continue at step 260; otherwise, the method may loop back to step 210.

At block 260, the migration agent may increase the rate of transferring the execution state of the virtual machine from the origin host computer system to the destination host computer system. In one example, the migration agent may resume the previously suspended transfer of the virtual machine execution state from the origin host computer system to the destination host computer system. Upon completing the operations schematically described by block 260, the method may loop back to step 210. Method 200 may be performed until the transfer of the VM state is completed.

Figure 3:
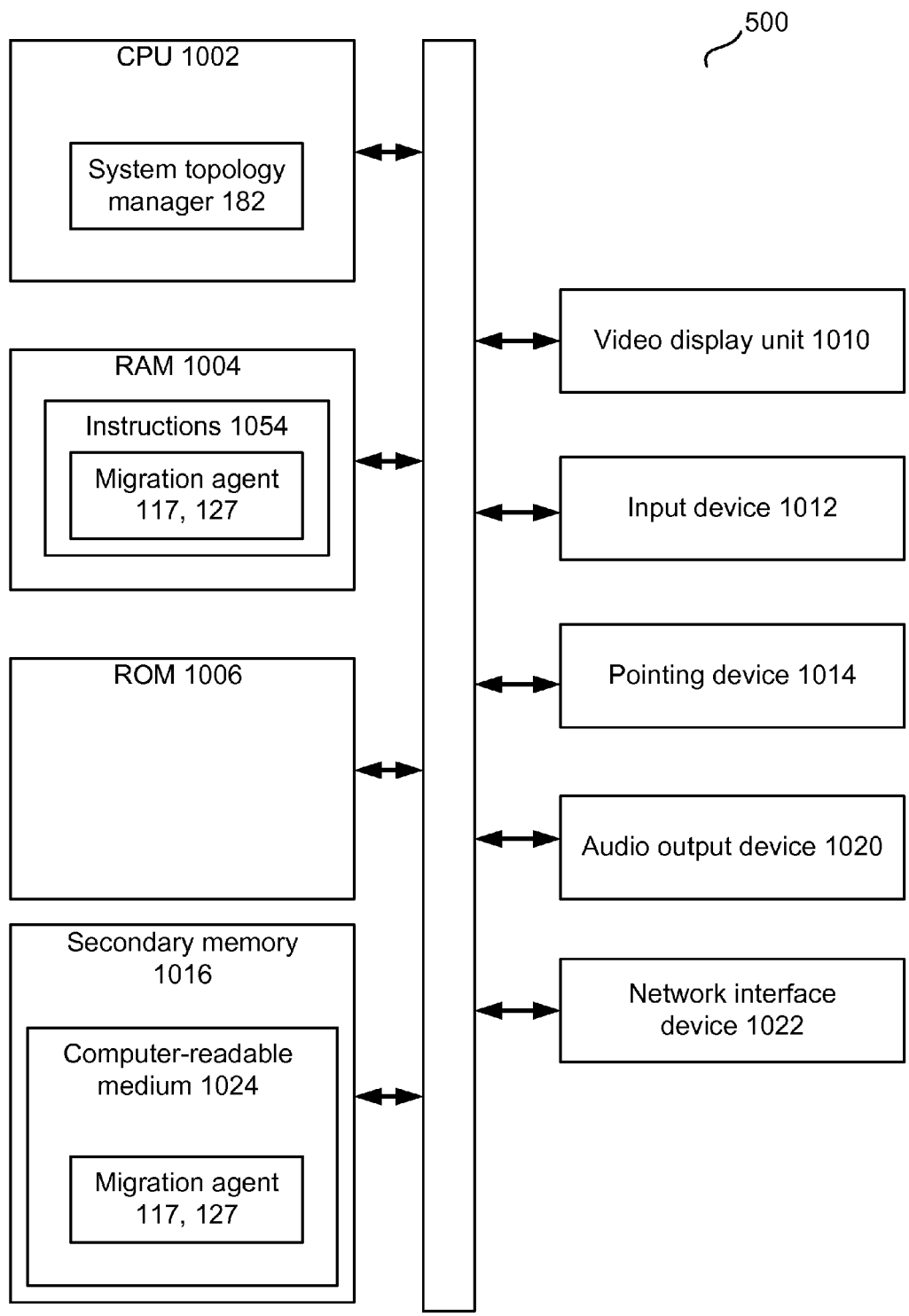
FIG. 3 depicts a block diagram of an illustrative computer system operating in accordance with the examples of the present disclosure.

FIG. 3 depicts an example computer system 300 within which a set of instructions, for causing the computer system to perform any one or more of the methods described herein, may be executed. In certain implementations, computer system 1000 may correspond to the host computer system 110, 120 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions of the migration agent 117, 127 implementing the method 200 of adjusting the rate of transmission of the execution state of a virtual machine undergoing live migration. Instructions of the migration agent 117, 127 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
    determining, by a processor, a first rate being a rate of change of an execution state of a virtual machine undergoing live migration from a first computer system to a second computer system;
    determining a second rate being a rate of transfer of the execution state of the virtual machine to the second computer system; and
    responsive to determining that a ratio of the first rate to the second rate exceeds a first threshold ratio, suspending the transfer of the virtual machine execution state to the second computer system, without suspending execution of the virtual machine.

2. The method of claim 1, wherein the first threshold ratio is less than or equal to 1.

3. The method of claim 1, further comprising:
    responsive to determining that the ratio of the first rate to the second rate is less than a second threshold ratio, resuming the transfer of the virtual machine execution state to the second computer system.

4. The method of claim 3, wherein the second threshold ratio is equal to the first threshold ratio.

5. The method of claim 1, wherein the execution state of the virtual machine comprises at least one of: a memory state, a virtual processor state, a virtual device state, or a connectivity state.

6. The method of claim 1, wherein the first rate is a size of memory pages that have been modified in a unit of time.

7. The method of claim 1, wherein the second rate is represented by one of: at least a fraction of a maximum network transmission rate or at least a fraction of an observed network transmission rate.

8. The method of claim 1, further comprising:
    responsive to determining that the ratio of the first rate to the second rate has failed to fall below a second threshold ratio, performing a post-copy migration procedure.

9. A system comprising:
    a memory; and
    a processor, operatively coupled to the memory, to:
        determine a first rate being a rate of change of an execution state of a virtual machine undergoing live migration from a first computer system to a second computer system;
        determine a second rate being a rate of transfer of the execution state of the virtual machine to the second computer system; and
        responsive to determining that a ratio of the first rate to the second rate exceeds a first threshold ratio, suspend the transfer of the virtual machine execution state to the second computer system, without suspending execution of the virtual machine.

10. The system of claim 9, wherein the first threshold ratio is less than or equal to 1.

11. The system of claim 9, wherein the processor is further to:

responsive to determining that the ratio of the first rate to the second rate is less than a second threshold ratio, resume the transfer of the virtual machine execution state to the second computer system.

12. The system of claim 11, wherein the second threshold ratio is equal to the first threshold ratio.

13. The system of claim 9, wherein the execution state of the virtual machine comprises at least one of: a memory state, a virtual processor state, a virtual device state, or a connectivity state.

14. The system of claim 9, wherein the first rate is a size of memory pages that have been modified in a unit of time.

15. The system of claim 9, wherein the second rate is represented by one of: at least a fraction of a maximum network transmission rate or at least a fraction of an observed network transmission rate.

16. A computer-readable non-transitory storage medium comprising executable instructions to cause a processor to:
   determine, by the processor, a first rate being a rate of change of an execution state of a virtual machine undergoing live migration from a first computer system to a second computer system;
   determine a second rate being a rate of transfer of the execution state of the virtual machine to the second computer system; and
   responsive to determining that a ratio of the first rate to the second rate exceeds a first threshold ratio, suspend the transfer of the virtual machine execution state to the second computer system, without suspending execution of the virtual machine.

17. The computer-readable non-transitory storage medium of claim 16, wherein the first threshold ratio is less than or equal to 1.

18. The computer-readable non-transitory storage medium of claim 16, further comprising executable instructions to cause the processor to:
   responsive to determining that the ratio of the first rate to the second rate is less than a second threshold ratio, resuming the transfer of the virtual machine execution state to the second computer system.

19. The computer-readable non-transitory storage medium of claim 18, wherein the second threshold ratio is equal to the first threshold ratio.

20. The computer-readable non-transitory storage medium of claim 18, wherein the execution state of the virtual machine comprises at least one of: a memory state, a virtual processor state, a virtual device state, or a connectivity state.

* * * * *